United States Patent
Takaki et al.

(10) Patent No.: US 8,525,466 B2
(45) Date of Patent: Sep. 3, 2013

(54) INVERTER DEVICE AND CONTROL METHOD THEREOF

(75) Inventors: Mamoru Takaki, Fukuoka (JP); Shinya Morimoto, Fukuoka (JP); Masaki Hisatsune, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 0 days.

(21) Appl. No.: 13/597,257

(22) Filed: Aug. 29, 2012

(65) Prior Publication Data
US 2012/0319629 A1 Dec. 20, 2012

Related U.S. Application Data

(63) Continuation of application No. PCT/JP2010/072616, filed on Dec. 16, 2010.

(30) Foreign Application Priority Data

Mar. 3, 2010 (JP) ................................ 2010-046046

(51) Int. Cl.
*G05B 11/28* (2006.01)

(52) U.S. Cl.
USPC .......................................... 318/599; 318/811

(58) Field of Classification Search
USPC ................. 318/599, 811, 798, 801, 805, 812, 318/432; 363/120, 131, 132
See application file for complete search history.

(56) References Cited

U.S. PATENT DOCUMENTS

| 5,298,848 | A | * | 3/1994 | Ueda et al. | 318/811 |
| 6,804,130 | B2 | * | 10/2004 | Morimoto | 363/132 |
| 2008/0246363 | A1 | * | 10/2008 | Atarashi et al. | 310/156.35 |
| 2008/0277191 | A1 | * | 11/2008 | Kasai | 180/444 |

FOREIGN PATENT DOCUMENTS

| JP | 2-307369 | 12/1990 |
| JP | 8-191572 | 7/1996 |
| JP | 2009-142112 | 6/2009 |
| JP | 2010-011639 | 1/2010 |

OTHER PUBLICATIONS

International Search Report for corresponding International Application No. PCT/JP2010/072616, Mar. 15, 2011.
Written Opinion for corresponding International Application No. PCT/JP2010/072616, Mar. 15, 2011.

* cited by examiner

*Primary Examiner* — Rina Duda
(74) *Attorney, Agent, or Firm* — Ditthavong Mori & Steiner, P.C.

(57) ABSTRACT

This inverter device includes a power portion performing PWM control on a voltage command to a motor for each set time period, converting direct-current power into alternating-current power, and outputting the same, a voltage command generation portion generating a voltage command in synchronization with a period N-times (N≧1) longer than the time period, an interval determination portion generating an interval determination signal which is ON during a half period of the time period and OFF during the next half period, a current detection portion detecting the current of the motor at timing of change in the interval determination signal, and a voltage correction portion generating a voltage correction value such that the amount of change in the detected current when the interval determination signal is ON becomes equal to the amount of change in the detected current when it is OFF and correcting the voltage command.

13 Claims, 7 Drawing Sheets

INVERTER DEVICE AND CONTROL METHOD THEREOF

CROSS-REFERENCE TO RELATED APPLICATIONS

The priority application number JP2010-046046, Inverter Device and Control Method Thereof, Mar. 3, 2010, Mamoru Takaki, Shinya Morimoto, and Masaki Hisatsune, upon which this patent application is based is hereby incorporated by reference. This application is a continuation of PCT/JP2010/072616, Inverter Device and Control Method Thereof, Dec. 16, 2010, Mamoru Takaki, Shinya Morimoto, and Masaki Hisatsune.

BACKGROUND OF THE INVENTION

1. Field of the Invention

The present invention relates to an inverter device driving a motor and a control method thereof.

2. Description of the Background Art

An inverter device capable of outputting a voltage to a motor according to a voltage command is required in general, and in order not to generate distortion in the output voltage, an inverter device configured not to generate a deviation voltage resulting from dead time is proposed (refer to Japanese Patent Laying-Open No. 2-307369, for example).

According to the technology of Japanese Patent Laying-Open No. 2-307369, in order to prevent an arm short circuit in a transistor that is a switching element, an output signal compensating for dead time is input to a gate drive circuit of the transistor later than a PWM gate signal. The output voltage of a transistor inverter is detected, and switching delay time is measured each time. Even if the switch-on time of the transistor, the switch-off time of the transistor, or the dead time is varied, a control amount is allowed to follow this to be varied. Thus, the PWM gate signal and the output voltage signal are constantly delayed for a given period of time.

Therefore, the output voltage delayed for a given period of time in comparison with the PWM signal is obtained, and its pulse width becomes equal to the pulse width of the output voltage signal so that an output voltage error is reduced. Furthermore, a voltage is directly detected to measure a switching delay, and hence even if the amount of dead time is varied by temperature change or the like, the amount of compensation is allowed to follow this to be amended.

However, the conventional inverter device requires a voltage detection circuit to obtain the output voltage signal. Furthermore, the deviation voltage is suppressed in 2×(td−tS) period (td: dead time, tS: storage time) for each half cycle of a fundamental frequency, but there is no suppression effect with respect to compensation for a voltage caused by the semiconducting properties of the transistor or a diode constituting the switching element, the floating capacitance of the drive circuit, or the like.

SUMMARY OF THE INVENTION

The present invention has been made in view of the aforementioned problems, and an object of the present invention is to provide an inverter device not requiring a voltage detection circuit and capable of compensating for a voltage error caused by a factor other than dead time and a control method thereof.

A typical present invention is an inverter device including a power portion performing PWM control on a voltage command to a motor for each set time period and outputting alternating-current power, and includes a voltage command generation portion generating a voltage command in synchronization with a period N-times ($N \geq 1$) longer than the time period and an interval determination portion generating an interval determination signal which is ON during a half period of the time period and OFF during the next half period, while the voltage command is corrected such that the amount of change in the detected current when the interval determination signal is ON becomes equal to the amount of change in the detected current when the interval determination signal is OFF at timing of change in the interval determination signal.

Another typical present invention is a control method of an inverter device including a power portion performing PWM control on a voltage command to a motor for each set time period, converting direct-current power into alternating-current power, and outputting the same, and includes generating a voltage command in synchronization with a period N-times ($N \geq 1$) longer than the time period, generating an interval determination signal which is ON during a half period of the time period and OFF during the next half period, calculating a difference value between a current detection value detected at timing of change in the interval determination signal and its previous value, and correcting the voltage command to the motor with such a voltage correction value that the amount of current change when the interval determination signal is ON becomes equal to the amount of current change when the interval determination signal is OFF.

According to the present invention, the magnitude of a current ripple component during the first half period of the PWM control is rendered equal to the magnitude of a current ripple component during the latter half period thereof, whereby the current ripple is reduced, and hence oscillations of a period equal to a PWM control period and noise caused by this can be suppressed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Embodiments of the present invention will now be described with reference to the accompanying drawings, wherein like reference numerals designate corresponding or identical elements throughout the various drawings.

Before describing the embodiments, a voltage error corrected in the present invention is described.

A power portion converting power includes a transistor Tr and a diode FD connected in reverse parallel thereto in each phase. With respect to the semiconducting properties of the diode FD constituting this transistor Tr, if a current flowing in a motor is small, the diode FD connected in reverse parallel to the transistor Tr is not turned ON completely so that a delay tends to be caused in switching of the transistor Tr, or a voltage level tends to be unsatisfactory due to incomplete switching. This delay in switching of the transistor Tr varies between ON timing and OFF timing of a gate signal to drive a base of the transistor Tr.

The similar problem is caused by the influence of floating capacitance around a main circuit. For example, a floating capacitor between an emitter and a collector of the transistor Tr has an influence. Depending on the magnitude of the current flowing in the motor, time to charge the floating capacitor differs, and when the floating capacitor is charged, a current is turned to zero according to a fine current command. The level of a motor terminal voltage becomes unsatisfactory due to these influences.

This phenomenon is also generated by a factor other than dead time to generate a voltage error. This voltage error is different between the first half period of a PWM control period and the latter half period thereof, and current ripple is generated.

In order to reduce the current ripple generated in this manner, for each of the first half period and the latter half period of the PWM control period, a ripple component of the motor current is extracted, control of reducing a difference between the current ripple components generated during the first half period and the latter half period to zero is performed, and the voltage error is corrected employing the output as a voltage correction value.

Embodiment 1

Figure 1:
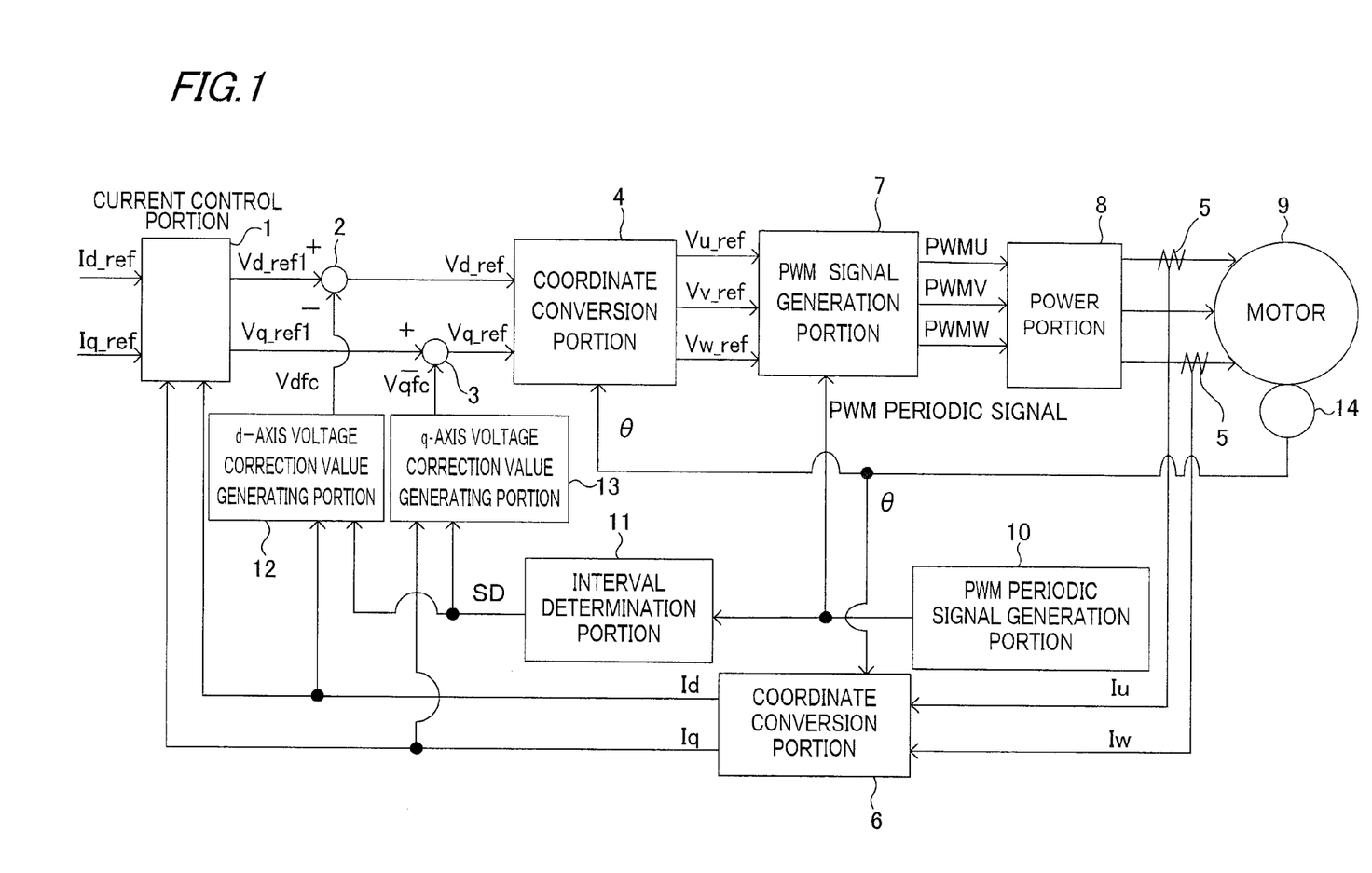
FIG. 1 is a block diagram of an inverter device showing a first embodiment.

FIG. 1 is a block diagram of an inverter device showing a first embodiment. This inverter device includes a current control portion 1, subtracters 2 and 3, a coordinate conversion portion 4, current detectors 5, a coordinate conversion portion 6, a PWM signal generation portion 7, a power portion 8, a motor 9, a PWM periodic signal generation portion 10, an interval determination portion 11, a d-axis voltage correction value generating portion 12, a q-axis voltage correction value generating portion 13, and a magnetic pole phase detector 14.

The current control portion 1 performs PI (proportional-integral) control on Id and Iq individually, for example, so that given current commands Id_ref and Iq_ref correspond to detection currents Id and Iq described later, and generates Vd_ref1 and Vg_ref1. Components in a coordinate system having a d-axis which is in a magnetic pole position direction and a q-axis orthogonal to this d-axis are denoted by d and q.

The subtracters 2 and 3 subtract voltage correction values Vdfc and Vqfc described later from Vd_ref1 and Vq_ref1, respectively, and output dq voltage commands Vd_ref and Vq_ref.

The coordinate conversion portion 4 outputs phase voltage commands Vu_ref, Vv_ref, and Vw_ref obtained by dq/UVW coordinate conversion, using the dq voltage commands Vd_ref and Vq_ref and a magnetic flux phase θ. The magnetic flux phase θ is detected by the magnetic pole phase detector 14 mounted on the motor shaft of the motor 9.

The current detectors 5 detect the phase currents Iu, Iv, and Iw of the motor 9 for each half period of a set period in synchronization with an interval determination signal SD described later.

The coordinate conversion portion 6 converts the phase currents Iu, Iv, and Iw into the detection currents Id and Iq by an operation inverse to the aforementioned operation of the coordinate conversion portion 4.

The PWM signal generation portion 7 performs PWM (pulse width modulation) control using a PWM control signal described later, such as a triangular carrier wave to convert the phase voltage commands Vu_ref, Vv_ref, and Vw_ref into PWM pulses, and outputs gate signals PWMU, PWMV, and PWMW.

The power portion 8 includes a main circuit including the transistor Tr and the flywheel diode FD in the upper and lower arms of each phase and a base drive circuit of the transistor Tr, and outputs voltages in response to the phase voltage commands Vu_ref, Vv_ref, and Vw_ref according to the aforementioned gate signals to drive the motor 9.

The PWM periodic signal generation portion 10 outputs the triangular carrier wave as the PWM periodic signal. The triangular carrier wave may be a carrier wave in another shape such as a sawtooth wave. Hereinafter, the expression "the mountain and valley of the triangular carrier wave" may be used, but with respect to the PWM periodic signal in a case of the carrier wave in another shape, the expression means every half period of the signal.

The interval determination portion 11 outputs the interval determination signal SD which is OFF (0) during the count-up interval (first half period) of the triangular carrier wave that is the PWM periodic signal and ON (1) during the count-down interval (latter half period) thereof.

Figure 2:
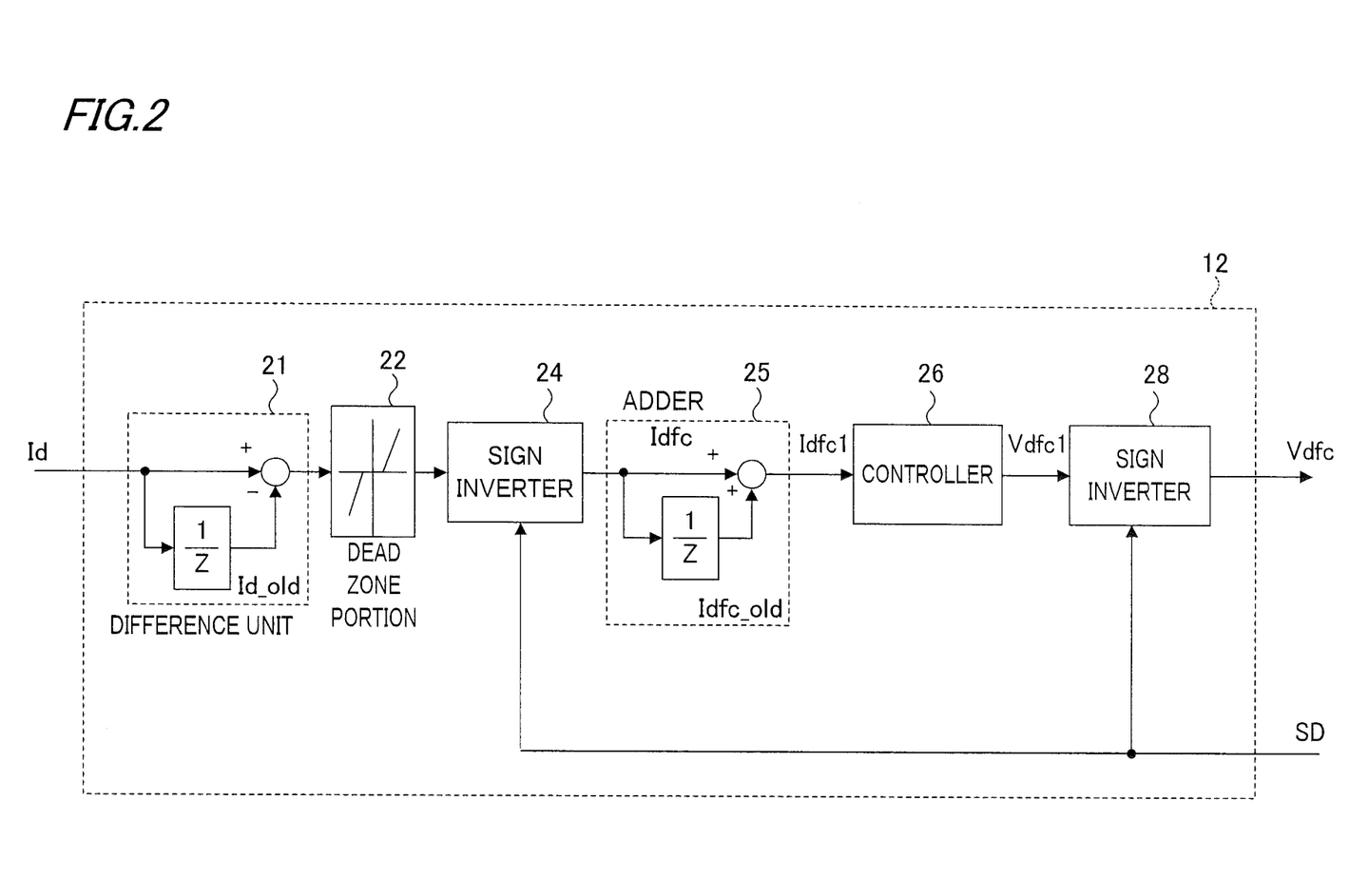
FIG. 2 is a block diagram showing details of a d-axis voltage correction value generating portion 12.

Next, the d-axis voltage correction value generating portion 12 is described using the drawings. As shown in FIG. 2, the d-axis voltage correction value generating portion 12 includes a difference unit 21, a dead zone portion 22, a sign inverter 24, an adder 25, a controller 26, and a sign inverter 28.

The difference unit 21 calculates a difference ΔId between the detection current Id and its previous value Id_old.

The dead zone portion 22 performs dead zone processing on the difference ΔId.

The dead zone portion 22 is provided to mainly remove a quantization error in current detection or switching noise if necessary.

The sign inverter 24 turns the difference ΔId to Idfc if the interval determination signal SD is OFF (0), and inverts the sign of the difference ΔId to turn the same to Idfc if the interval determination signal SD is ON (1).

The adder 25 adds Idfc to its previous value Idfc_old to obtain Idfc1, and updates the previous value Idfc_old with Idfc.

In this manner, a ripple component of the detection current Id is extracted for each half period of the triangular carrier wave, and a difference between current ripple components generated during the first half period and the latter half period is extracted as Idfc1.

The controller 26 performs control of turning the difference Idfc1 of the current ripple component to zero, and calculates a d-axis voltage correction value Vdfc1. The controller 26 is constituted by a controller employing at least a proportioner or integrator.

The sign inverter 28 keeps the d-axis voltage correction value Vdfc1 to Vdfc if the interval determination signal SD is OFF (0), and inverts the sign of the d-axis voltage correction value Vdfc1 to turn the same to Vdfc if the interval determination signal SD is ON (1).

In this manner, the d-axis voltage correction value Vdfc to compensate for the aforementioned difference of the current ripple component is generated.

The d-axis voltage correction value generating portion 12 outputs the d-axis voltage correction value Vdfc to the subtracter 2 shown in FIG. 1.

The q-axis voltage correction value generating portion 13 performs processing similar to the processing performed by the q-axis voltage correction value generating portion 12, on the detection current Iq to generate the q-axis voltage correction value Vqfc, and outputs the same to the subtracter 3 shown in FIG. 1.

In this manner, the embodiment 1 is practiced.

In the aforementioned description, the difference between the current ripple components generated during the first half period and the latter half period of the triangular carrier wave may be obtained by forming FFT by software and extracting a frequency component corresponding to one period of the triangular carrier wave.

Although omitted in the aforementioned description, a dead time circuit is generally added to the PWM signal generation portion 7. The voltage compensation for this is performed by adding a voltage drop value corresponding to dead time Td to the dq voltage commands Vd_ref and Vq_ref or the phase voltage commands Vu_ref, Vv_ref, and Vw_ref in the coordinate conversion portion 4 or by correcting the pulse widths of the PWM pulses with a pulse width corresponding to the dead time Td in advance in the PWM signal generation portion 7.

Although it has been described that the magnetic flux phase θ is detected with the magnetic pole phase detector 14, the magnetic flux phase θ may be obtained by estimation with a magnetic pole estimator into which the command current or detection current, the command voltage or detection voltage, etc. of the motor 9 are input.

Figure 3:
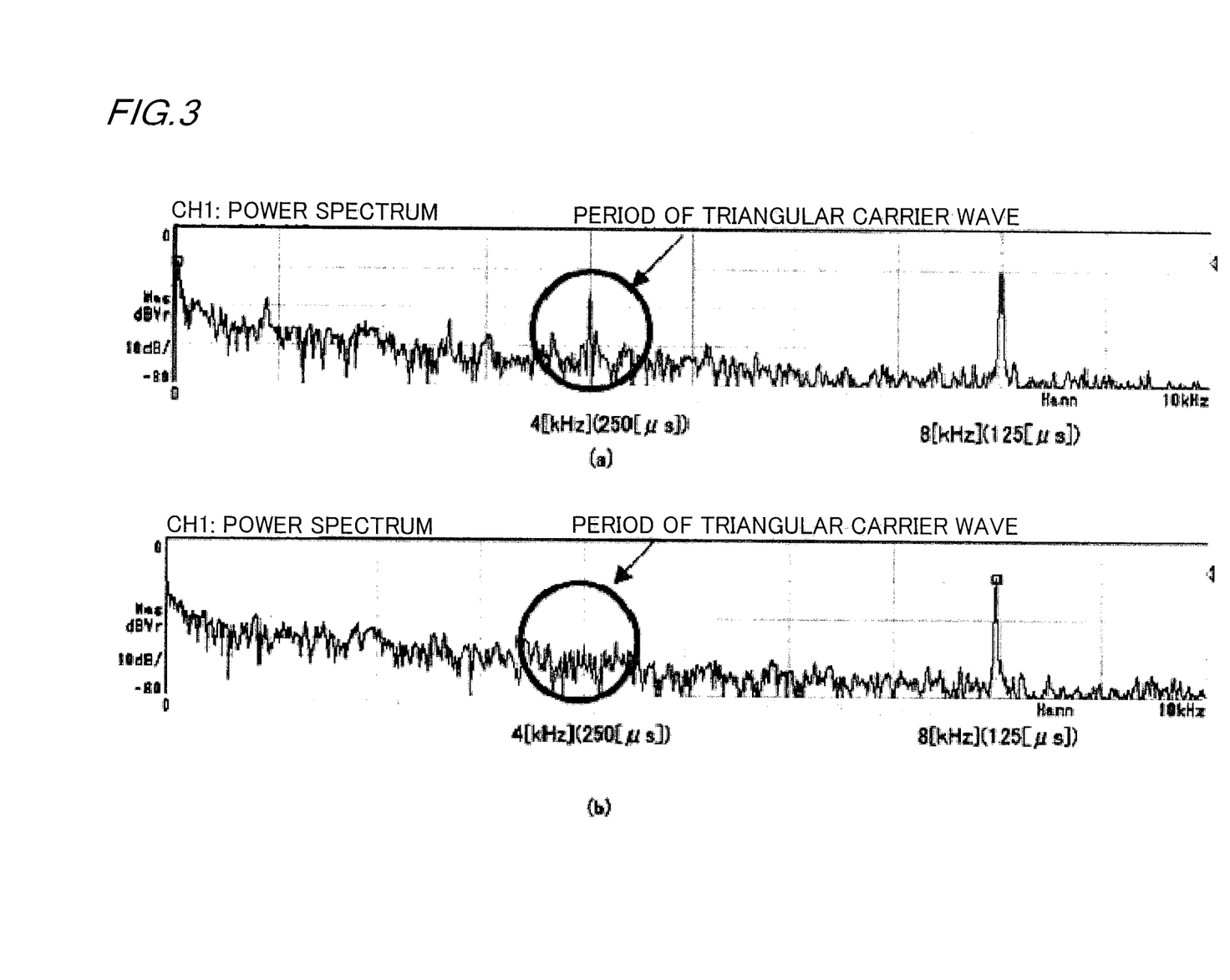
FIG. 3 is test data showing the effects of the present invention.

Next, the effects of the inverter device to which the embodiment 1 is applied are described using the drawings. FIG. 3 illustrates test data showing the effects of the present invention, obtained by performing an FFT analysis on noise generated from the motor 9. FIG. 3(a) is a power spectrum diagram in a case where no embodiment 1 is applied, and FIG. 3(b) is a power spectrum diagram in a case where the embodiment 1 is applied. The capacity of the motor employed in a test is 200 [W], the rated current is 1.2 [Arms], the period of the triangular carrier wave is 250 [μs], the motor is put in a state where rotation is stopped, and the current corresponds to about 8[%] of the rated current.

FIG. 3 shows that the power spectrum value at the time when the frequency of the triangular carrier wave is 4 kHz is significantly reduced by applying the embodiment 1.

Thus, the magnitude of the current ripple during the first half period of the PWM control period is rendered equal to the magnitude of the current ripple during the latter half period thereof, whereby oscillations of the PWM control period can be reduced while noise associated with this can be reduced.

Embodiment 2

Figure 4:
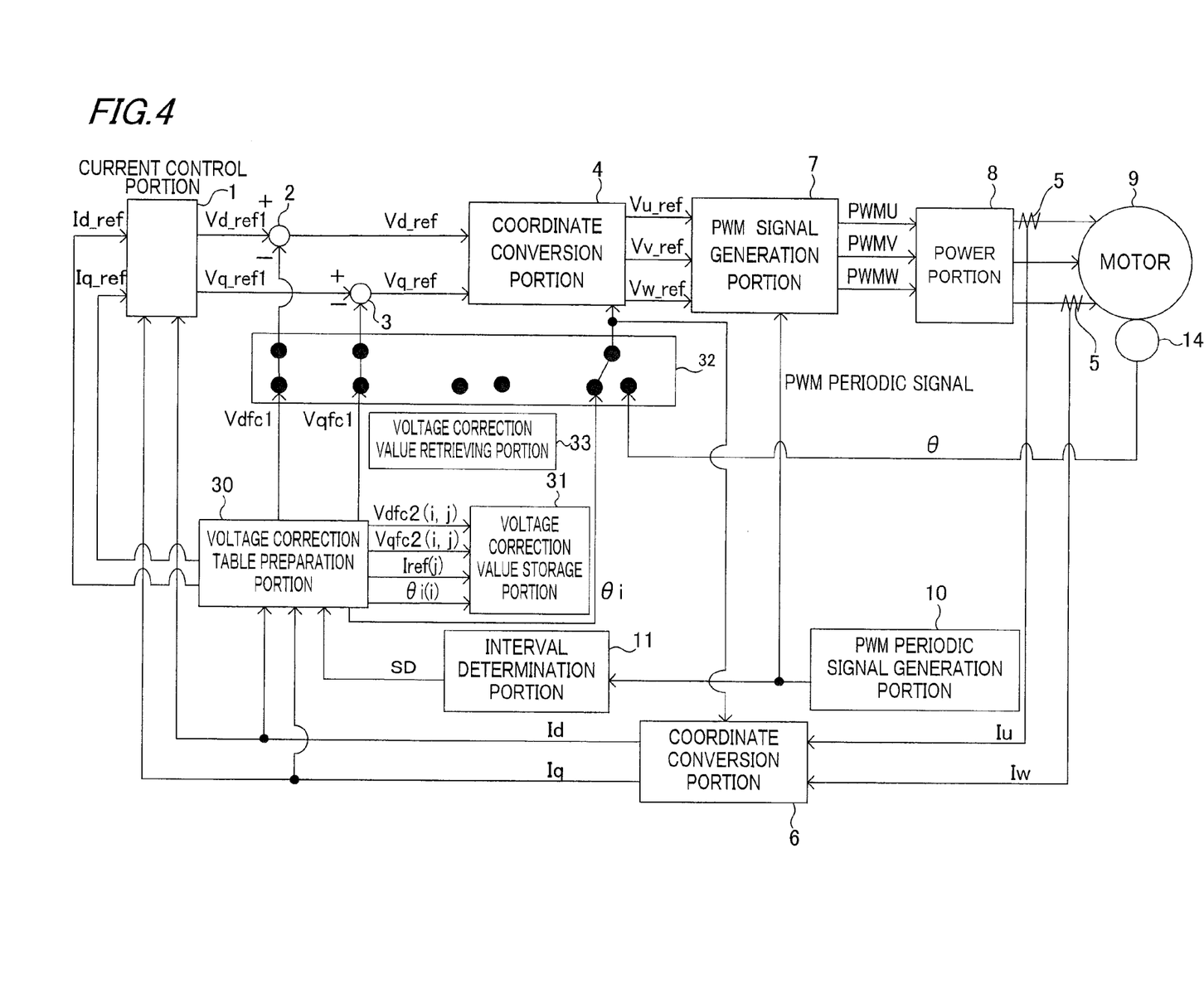
FIG. 4 is a block diagram of an inverter device (at the time of preparing a table) showing a second embodiment.
Figure 5:
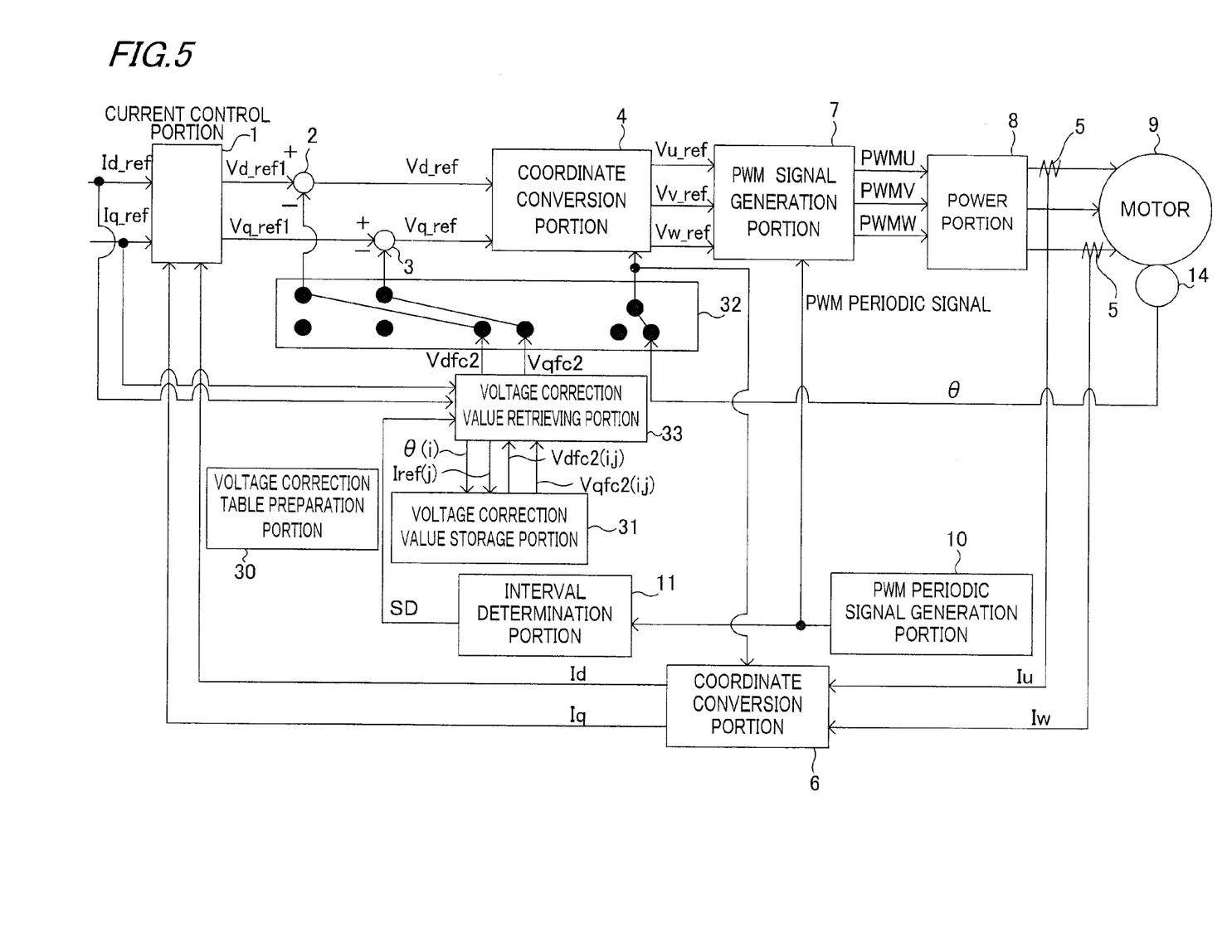
FIG. 5 is a block diagram of the inverter device (at the time of retrieving the table) showing the second embodiment.

FIGS. 4 and 5 are block diagrams of an inverter device showing a second embodiment. This inverter device includes an operation mode switching portion 32 and a voltage correction value retrieving portion 33 in addition to the structure of FIG. 1, and includes a voltage correction table preparation portion 30 and a voltage correction value storage portion 31 in place of the d-axis voltage correction value generating portion 12 and the q-axis voltage correction value generating portion 13. The second embodiment is hereinafter described with a focus on preparation and retrieving of a voltage correction table.

The preparation of the voltage correction table is performed by the structure of FIG. 4.

Figure 6:
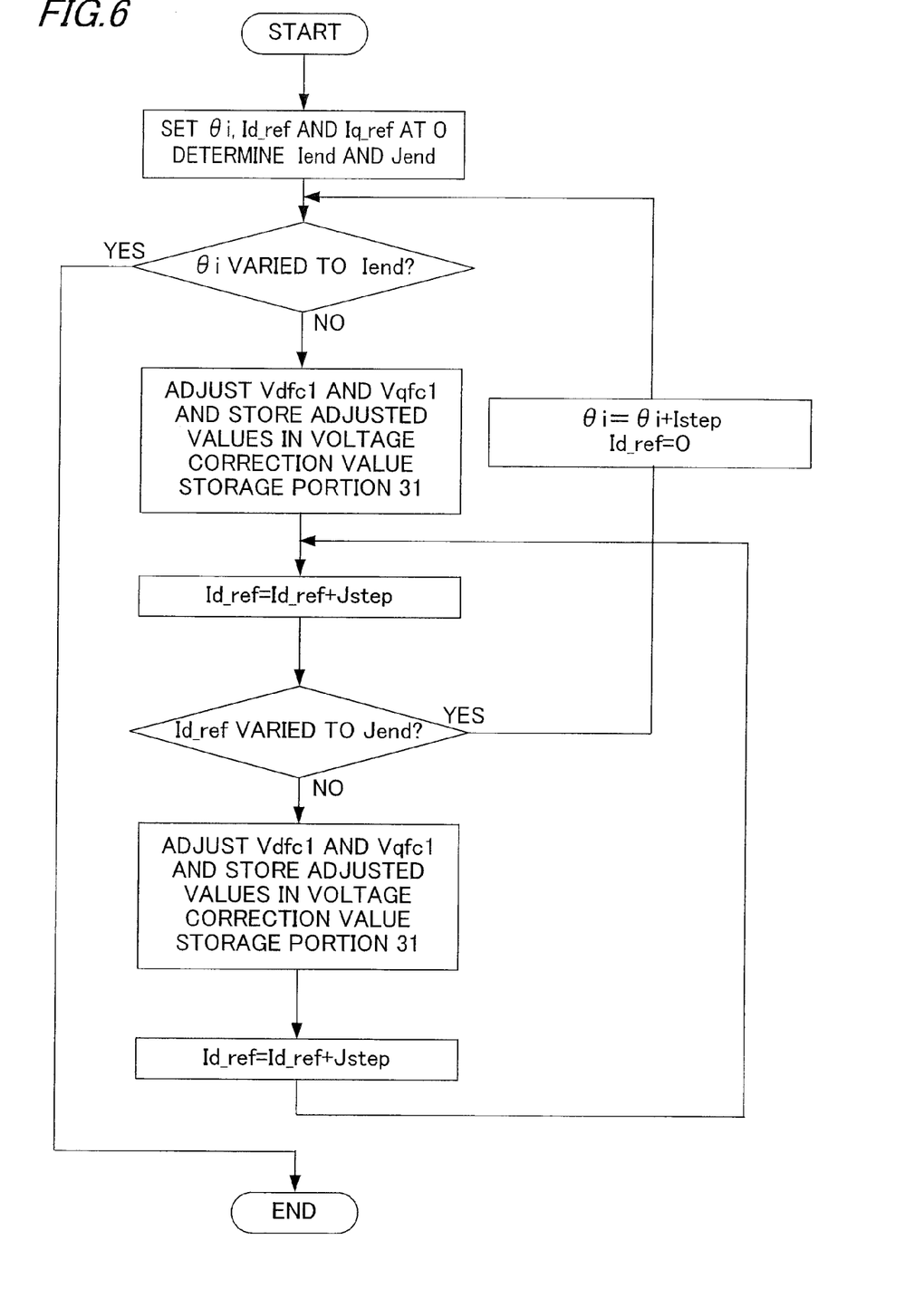
FIG. 6 is a flowchart showing processing showing processing procedures in a voltage correction table preparation portion 30.

The voltage correction table preparation portion 30 prepares the voltage correction table by sequential processing shown in FIG. 6. This preparation processing is now described.

First, the operation mode switching portion 32 described later switches a magnetic flux phase θ employed in a coordinate conversion portion 4 and a coordinate conversion portion 6 to an electrical angle phase θi of a current. In a current control portion 1, the electrical angle phase θi is set at 0 [deg] while current commands Id_ref and Iq_ref are set at 0, and operation is started.

Then, the magnitude of the ripple of a detection current Id during the first half period is compared with the magnitude of the ripple of the detection current Id during the latter half period for each half period of a triangular carrier wave, and a voltage correction value Vdfc1 is increased or decreased to be adjusted so that both become equal to each other. At this adjustment, the voltage correction table preparation portion 30 keeps the voltage correction value Vdfc1 during the adjustment unchanged if an interval determination signal SD is OFF (0) and inverts the sign of the voltage correction value Vdfc1 during the adjustment if the interval determination signal SD is ON (1), and thereafter outputs the same to a subtracter 2. The voltage correction value Vdfc1 is subtracted from Vd_ref1 output by the current control portion 1 to prepare a d-axis voltage command Vd_ref.

The aforementioned processing is repeated to determine the voltage correction value Vdfc1 at the time when the magnitude of the ripple of the detection current Id during the first half period becomes equal to the magnitude of the ripple of the detection current Id during the latter half period for each half period of the triangular carrier wave.

A matching condition at this time may be that the aforementioned difference is within a prescribed value, or if the voltage correction value Vdfc1 repeatedly becomes a value of A or B, it may be set at (A+B)/2.

The aforementioned processing is also performed on a detection current Iq, and repeated until the magnitude of the ripple of the detection current Iq during the first half period becomes equal to the magnitude of the ripple of the detection current Iq during the latter half period for each half period of the triangular carrier wave, whereby a voltage correction value Vqfc1 is determined.

Then, an electrical angle phase θi(i) of the current at this time is output to the voltage correction value storage portion 31, Idref at this time is output thereto as the magnitude Iref(j) of the current, the voltage correction value Vdfc1 that has been determined at this time is output thereto as Vdfc2(i, j), and the voltage correction value Vqfc1 that has been determined at this time is output thereto as Vqfc2(i, j). The aforementioned processing is performed for each Istep when the electrical angle phase θi is from 0 to Tend, and as to the electrical angle phase θi, it is performed for each Jstep when the current command Id_ref is from 0 to Jend.

In this manner, the voltage correction table preparation portion 30 generates the voltage correction table, and the voltage correction value storage portion 31 stores the voltage correction table of the voltage correction values Vdfc2(i, j) and Vqfc2(i, j) employing the electrical angle phase θi(i) and the magnitude Iref(j) of the current as arguments.

The values of Istep and Jstep are basically determined in response to required accuracy and the acceptable size (memory capacity) of the table. The smaller the current command Id_ref is, the larger the rate of change of the voltage correction value is, and hence a variable amount of the magnitude of the current does not become constant. However, if the values of Istep and Jstep are more finely varied as the current command Id_ref gets smaller, an efficient table can be prepared.

Furthermore, if the maximum voltage correction value or the maximum value of the electrical angle phase θi necessary as a table is known in advance, the preparation of the table may be stopped on the basis of the size.

Furthermore, the properties of a transistor Tr or the like may be identical for the upper arm and lower arm of each phase, and a table with the electrical angle phase θi of 0 to 60 degrees may be employed.

The operation mode switching portion 32 switches a mode (table preparation mode) in which the voltage correction table of the voltage correction values Vdfc2($i$, $j$) and Vqfc2($i$, $j$) is stored in the voltage correction value storage portion 31 and a mode (table retrieving mode) in which the voltage correction values Vdfc2($i$, $j$) and Vqfc2($i$, $j$) are retrieved from the voltage correction value storage portion 31.

This switching of operation is performed by switching of voltage correction values Vdfc and Vqfc output to subtracters 2 and 3, the magnetic flux phase θ, and the current commands Id_ref and Iq_ref, which are not illustrated.

In other words, in the table preparation mode, they are the voltage correction values Vdfc1 and Vqfc1 output by the voltage correction value storage portion 31, the electrical angle phase θi, and current commands sequentially varied.

In the table retrieving mode, they are voltage correction values Vdfc2 and Vqfc2 output by the voltage correction value retrieving portion 33, the magnetic flux phase θ output by a magnetic pole phase detector 14, and current commands given from the outside.

The retrieving of the voltage correction table is performed by the structure of FIG. 5.

In the table retrieving mode, the voltage correction value retrieving portion 33 employs the electrical angle phase θi(i) of the current and the magnitude Iref(j) of the current as arguments to retrieve the voltage correction values Vdfc2($i$, $j$) and Vqfc2($i$, $j$) corresponding to this from the voltage correction table stored in the voltage correction value storage portion 31. The electrical angle phase θi(i) of the current and the magnitude Iref(j) of the current are obtained according to formulas (1) and (2), respectively, values less than and greater than a pertinent value are retrieved from the table prepared in the voltage correction value storage portion 31, and linear interpolation is performed on the retrieved values to obtain the voltage correction values Vdfc2 and Vqfc2.

$$\theta i(i) = \theta + \tan^{-1}(Iq\_ref/Id\_ref) \quad (1)$$

$$Iref(j) = \sqrt{(Iq\_ref^2 + Id\_ref^2)} \quad (2)$$

In the calculation of the electrical angle phase θi(i) of the current and the magnitude Iref(j) of the current according to the formulas (1) and (2), the detection currents Id and Iq may be employed in place of the given current commands Id_ref and Iq_ref.

The voltage correction values Vdfc2 and Vqfc2 obtained in this way are kept unchanged if the interval determination signal SD is OFF (0), and the signs thereof are inverted if the interval determination signal SD is ON (1). Then, the voltage correction values Vdfc2 and Vqfc2 are output to the subtracters 2 and 3, respectively, whereby the embodiment 2 is practiced.

Although the preparation and utilization of the voltage correction table on the d-q axes have been described above, a table of phase voltages in UVW may be employed, or the voltage correction table may be prepared as a function of at least the electrical angle phase θi or the magnitude Iref of the current.

When compensating for phase voltage commands Vu_ref, Vv_ref, and Vw_ref, two-phase/three-phase conversion may be performed on the voltage correction values Vdfc2 and Vqfc2, or voltage correction values Vufc2($i$, $j$), Vvfc2($i$, $j$), and Vwfc2($i$, $j$) may be measured by correcting the voltage correction values according to the voltage commands of U, V, and W phases. At this measurement, the voltage correction values of two phases, Vufc2($i$, $j$) and Vwfc2($i$, $j$) for example, may be measured, and the voltage correction value of the remaining one phase may be calculated from the measured voltage correction values of two phases.

Furthermore, when correcting a voltage command of one phase, phase voltage outputs of the remaining two phases are varied. Thus, this may be utilized to measure a voltage correction value of one phase, and the voltage correction value may be employed in correction. A voltage command of an intermediate phase of three phases may be selected as the voltage command of one phase at this time.

Embodiment 3

Figure 7:
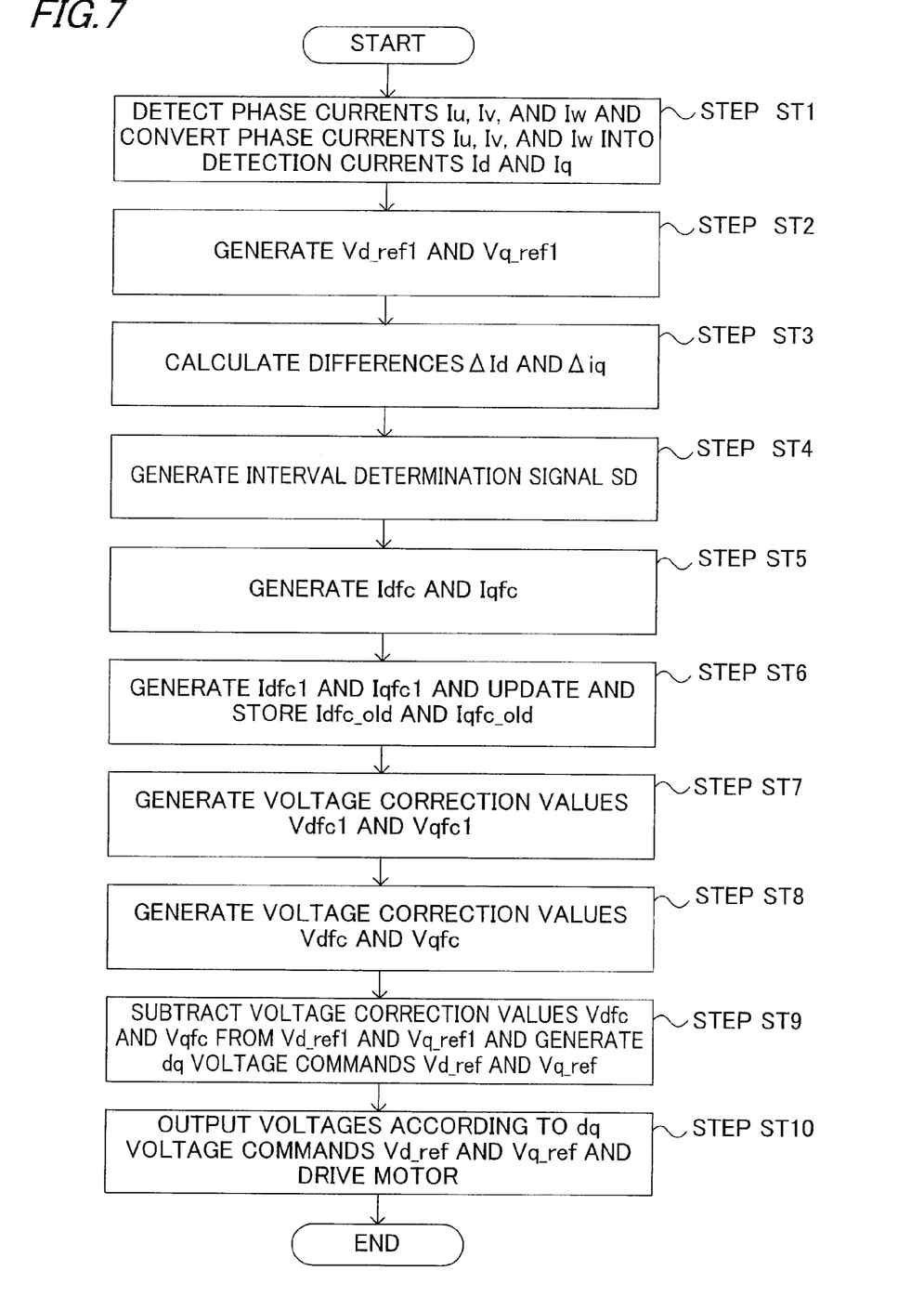
FIG. 7 is a flowchart showing processing procedures of third Embodiment.

Next, a third embodiment is described. FIG. 7 is a flowchart showing a control method of an inverter device according to the third embodiment. Steps are sequentially described.

At a step ST1, phase currents Iu and Iv of a motor 9 are detected at timing of each of the mountain and valley of a triangular carrier wave, and converted into detection currents Id and Iq.

At a step ST2, PI (proportional-integral) control is performed, for example, so that given current commands Id_ref and Iq_ref correspond to the detection currents Id and Iq, and Vd_ref1 and Vq_ref1 are generated.

At a step ST3, differences ΔId and ΔIq between the detection currents Id and Iq and their previous values are calculated.

At a step ST4, an interval determination signal SD which is OFF (0) during an interval of change from the valley of the triangular carrier wave to the mountain of thereof and ON (1) during an interval of change from the mountain to the valley is generated.

At a step ST5, if the interval determination signal SD is OFF (0), ΔId is turned to Idfc, and ΔIq is turned to Iqfc. If the interval determination signal SD is ON (1), −ΔId is turned to Idfc, and −ΔIq is turned to Iqfc.

At a step ST6, Idfc and Iqfc are added to their previous values Idfc_old and Iqfc_old, respectively to obtain Idfc1 and Iqfc1, and the previous values Idfc_old and Iqfc_old are updated with Idfc and Iqfc to be stored.

At a step ST7, PI control is performed, for example, so that Idfc and Iqfc become zero, and the outputs are turned to voltage correction values Vdfc1 and Vqfc1.

At a step ST8, if the interval determination signal SD is OFF (0), Vdfc1 and Vqfc1 are turned to voltage correction values Vdfc and Vqfc. If the interval determination signal SD is ON (1), −Vdfc1 and −Vqfc1 are turned to the voltage correction values Vdfc and Vqfc.

At a step ST9, the voltage correction values Vdfc and Vqfc are subtracted from Vd_ref1 and Vq_ref1, and dq voltage commands Vd_ref and Vq_ref are generated.

At a step ST10, voltages are output according to the dq voltage commands Vd_ref and Vq_ref to drive the motor 9.

The specific processing of each step has been described in the first embodiment, and hence it is omitted here. Although it has been described that current control performed at the step ST2 is performed every time when the detection currents Id and Iq are generated, the current control may be performed at the time of either the mountain or valley of the triangular carrier wave or may be performed every couple of mountains and valleys. In this manner, the third embodiment is practiced.

Although the first to third embodiments have been described above, the present invention is not restricted to the aforementioned embodiments but can be modified properly.

For example, in the operation of the PWM signal generation portion 7 in FIG. 1, the gate signals PWMU, PWMV, and PWMW may be determined using a space vector method in place of a triangular wave comparison method.

In the space vector method, a voltage command (vector) is formed so as to be time-averaged, using two voltage vectors (V1 and V2, for example) adjacent to each other of fundamental voltage vectors V1 to V7, and the updating of the voltage command (vector) is performed for each half period of a set time period.

Therefore, also in the space vector method, the gate signals PWMU, PWMV, and PWMW are output for each time corresponding to a half period of the set period of the triangular carrier wave.

Therefore, even if voltage errors generated during the first half period and the latter half period of a PWM control period are different from each other, a voltage can be corrected, and the effects similar to those of the triangular wave comparison method can be obtained. Furthermore, if the interval determination signal SD output from an interval determination portion 11 is generated in synchronization with update timing of the voltage command (vector), the present invention can be practiced.

The voltage commands that the voltage correction values compensate are not restricted to the dq voltage commands Vd_ref and Vq_ref.

Similarly to the aforementioned compensation for dead time, they may be the phase voltage commands Vu_ref, Vv_ref, and Vw_ref or may be converted into the pulse width of a PWM signal and compensated for. When compensating for the phase voltage commands Vu_ref, Vv_ref, and Vw_ref, two-phase/three-phase conversion may be performed on the voltage correction values Vdfc and Vqfc, or a voltage correction value for each of U, V, and W phases may be calculated. For example, a U-phase voltage correction value Vufc can be calculated by performing processing similar to the processing performed by the d-axis voltage correction value generating portion 12 on a U-phase current Iu. The conversion into the pulse width of the PWM signal can be obtained by converting the phase voltage correction values Vufc, Vvfc, and Vwfc into the pulse width of the PWM pulse in the PWM signal generation portion 7. Even if the phase voltage commands Vu_ref, Vv_ref, and Vw_ref or the pulse width of the PWM signal is compensated for in this manner, obviously the similar effects can be obtained.

Furthermore, although it has been described above that the current control portion 1 performing current control is so provided that the current commands Id_ref and Iq_ref correspond to the detection currents Id and Iq, such current control that currents of at least two phases of three U, V, and W phases correspond to commands may be performed. Furthermore, even if the voltage correction values are compensated for with respect to given voltage commands without providing the current control portion as in V/f constant control, the similar effects can be obtained.

Obviously, numerous modifications and variations of the present invention are possible in light of the above teachings. It is therefore to be understood that within the scope of the appended claims, the invention may be practiced otherwise than as specifically described herein.

What is claimed is:

1. An inverter device comprising a power portion performing PWM control on a voltage command to a motor for each set time period and outputting alternating-current power, comprising:
    a voltage command generation portion generating a voltage command in synchronization with a period N-times longer than the time period, where $N \geq 1$;
    an interval determination portion generating an interval determination signal which is ON during a half period of the time period and OFF during a next half period;
    a current detection portion detecting a current of the motor at timing of change in the interval determination signal;
    a voltage correction value generating portion generating a voltage correction value such that the amount of change in the detected current when the interval determination signal is ON becomes equal to the amount of change in the detected current when the interval determination signal is OFF; and
    a voltage correction portion correcting the voltage command with the voltage correction value.

2. The inverter device according to claim 1, wherein the voltage correction value generating portion comprises a current ripple detection portion extracting a current ripple component in synchronization with the set time period, and generates a voltage correction value on the basis of the current ripple component and the interval determination signal.

3. An inverter device comprising a power portion performing PWM control on a voltage command to a motor for each set time period and outputting alternating-current power, comprising:
    a voltage command generation portion generating a voltage command in synchronization with a period N-times longer than the time period, where $N \geq 1$;
    an interval determination portion generating an interval determination signal which is ON during a half period of the time period and OFF during a next half period;
    a current detection portion detecting a current of the motor at timing of change in the interval determination signal;
    a voltage correction value storage portion storing a voltage correction table employing at least an electrical angle phase of a current or a magnitude of the current as an argument;
    a voltage correction value retrieving portion retrieving a voltage correction value from the voltage correction table; and
    a voltage correction portion correcting the voltage command with the voltage correction value.

4. The inverter device according to claim 3, comprising a voltage correction table preparation portion preparing the voltage correction table, wherein
    the voltage correction table preparation portion sequentially varies at least the electrical angle phase of the current or the magnitude of the current, calculates a difference value between a current detection value detected at the timing of change in the interval determination signal and its previous value, and stores such a voltage correction value that the amount of current change when the interval determination signal is ON becomes equal to the amount of current change when the interval determination signal is OFF as the voltage correction table in the voltage correction value storage portion.

5. The inverter device according to claim 1 or 3, wherein the voltage command generation portion comprises a current control portion controlling the current of the motor in a d-q axis coordinate system having a d-axis which is in a magnetic pole position direction of the motor and a q-axis orthogonal to the d-axis.

6. The inverter device according to claim 1 or 3, wherein the voltage command generation portion comprises a current control portion controlling the current of the motor in at least two phases in a UVW-coordinate system corresponding to each phase of the motor.

7. The inverter device according to claim 1 or 3, wherein the voltage correction portion generates the voltage correction value in a d-q axis coordinate system having a d-axis which is in a magnetic pole position direction of the motor and a q-axis orthogonal to the d-axis on the basis of the current detection, and corrects a dq voltage command.

8. The inverter device according to claim 1 or 3, wherein the voltage correction portion generates the voltage correction value in a UVW-coordinate system corresponding to each phase of the motor on the basis of the current detection, and corrects a UVW voltage command.

9. The inverter device according to claim 1 or 3, wherein the voltage correction portion generates the voltage correction value in a UVW-coordinate system corresponding to each phase of the motor on the basis of the current detection, and converts the voltage correction value into a PWM time width in PWM control to make a correction.

10. The inverter device according to claim 1 or 3, wherein the power portion converts power on the basis of a carrier wave comparison modulation method.

11. The inverter device according to claim 1 or 3, wherein the power portion converts power on the basis of a space voltage vector modulation method.

12. A control method of an inverter device comprising a power portion performing PWM control on a voltage command to a motor for each set time period and outputting alternating-current power, comprising:

generating an interval determination signal which is ON during a half period of the time period and OFF during a next half period;

detecting a current of the motor at timing of change in the interval determination signal;

calculating a difference value between a current detection value and its previous value;

generating a voltage correction value such that the amount of change in the current of the motor when the interval determination signal is ON becomes equal to the amount of change in the current of the motor when the interval determination signal is OFF; and correcting the voltage command with the voltage correction value.

13. A control method of an inverter device comprising a power portion performing PWM control on a voltage command to a motor for each set time period and outputting alternating-current power and a voltage correction value storage portion storing a voltage correction table, comprising:

generating a voltage command in synchronization with a period N-times longer than the time period, where $N \geq 1$;

generating an interval determination signal which is ON during a half period of the time period and OFF during a next half period;

detecting a current of the motor at timing of change in the interval determination signal;

calculating a given current command or at least either an electrical angle phase of the detected current or a magnitude of the detected current;

retrieving a voltage correction value, employing at least the electrical angle phase of the current or the magnitude of the current as an argument; and correcting the voltage command with the voltage correction value.

\* \* \* \* \*